Dec. 11, 1934.  F. E. STAHL  1,983,683
CHAIN FORMING MACHINE
Filed June 23, 1933   2 Sheets-Sheet 1
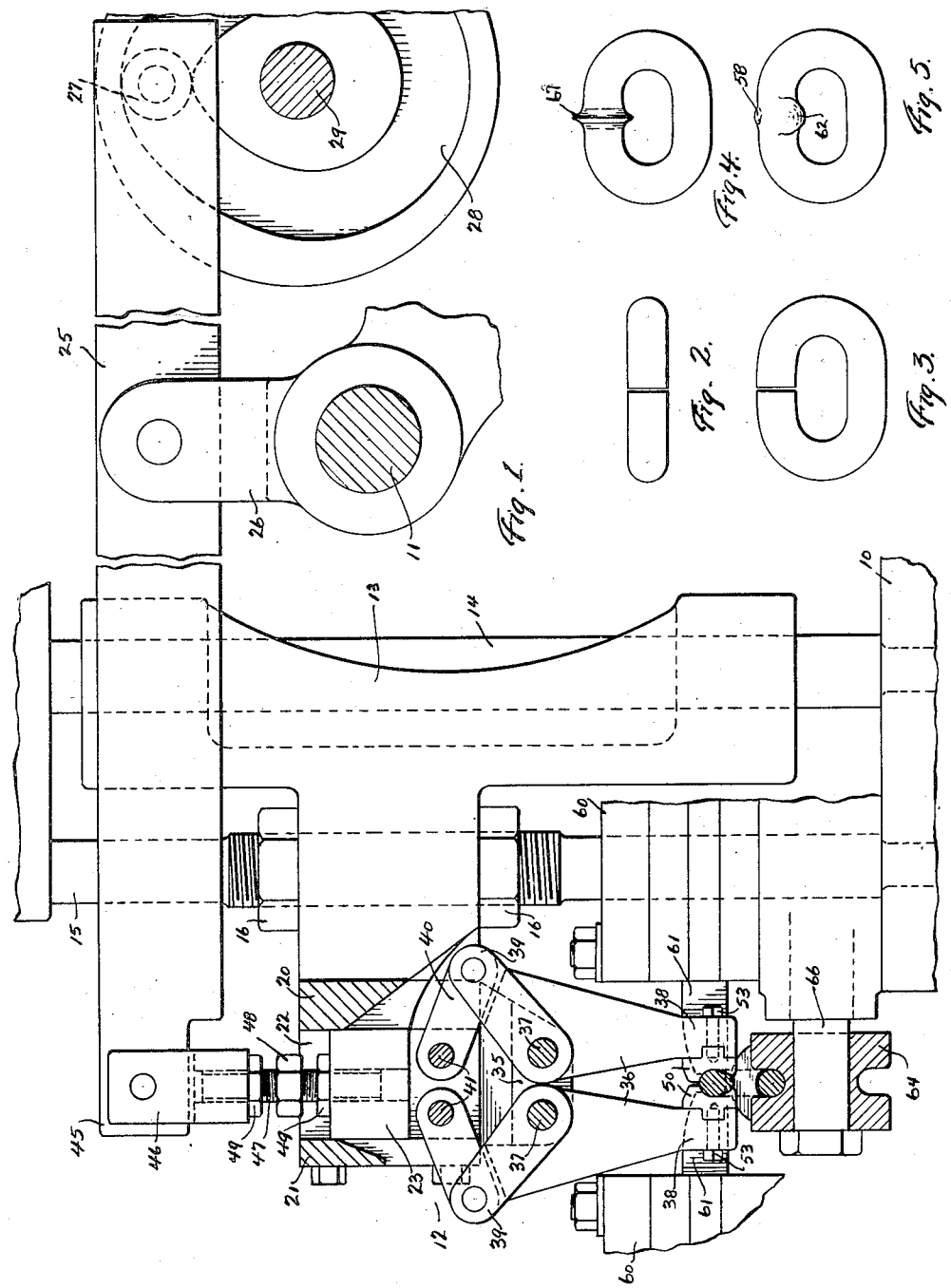
INVENTOR
FRANK E. STAHL
By
J.W.M.Ellis
ATTORNEY Dec. 11, 1934.                F. E. STAHL                1,983,683
                          CHAIN FORMING MACHINE
                    Filed June 23, 1933        2 Sheets-Sheet 2
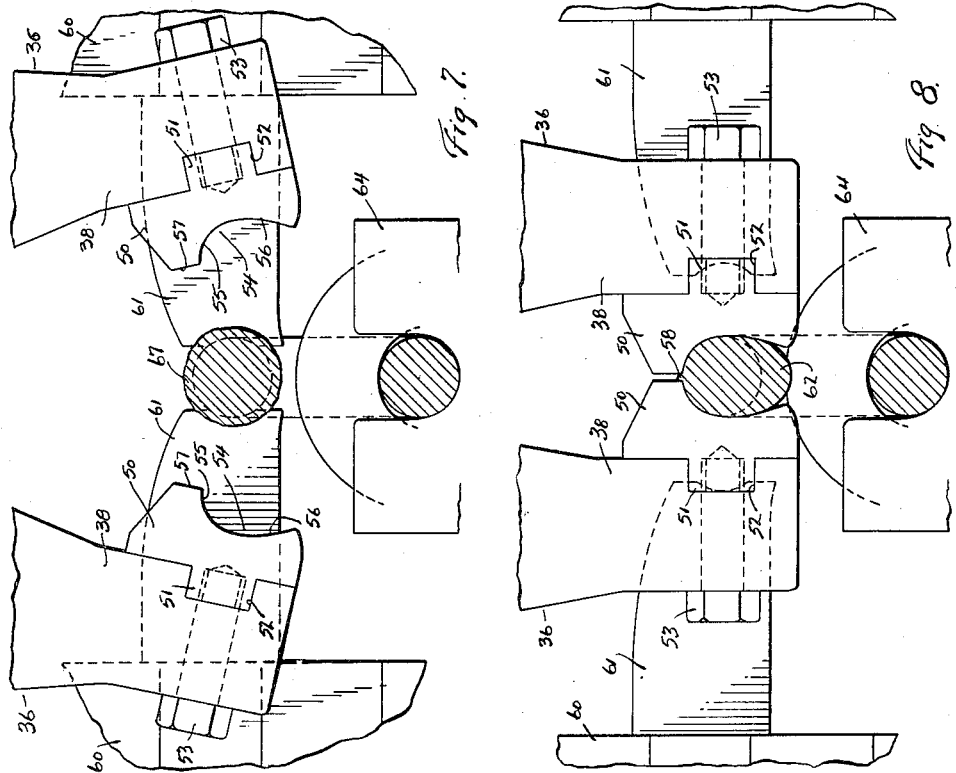
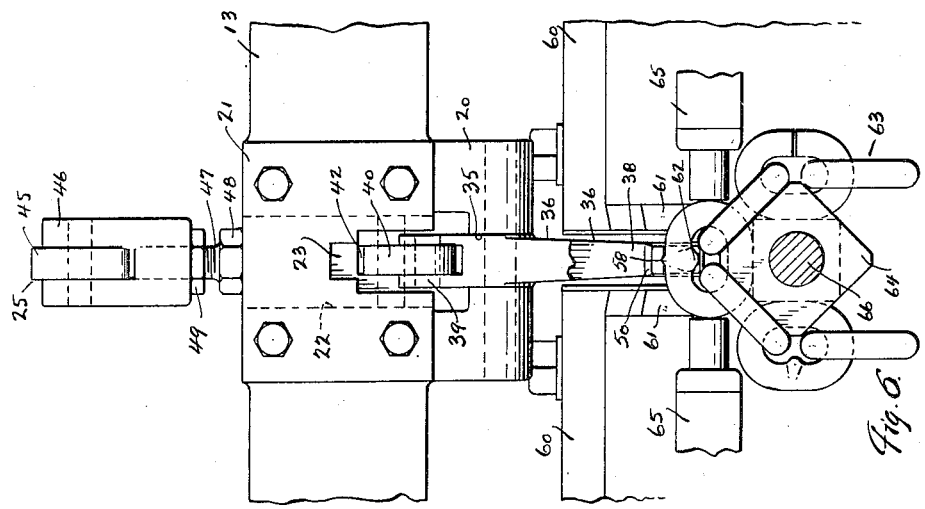
INVENTOR
FRANK E. STAHL
By
J. W. Ellis
ATTORNEY Patented Dec. 11, 1934

1,983,683

UNITED STATES PATENT OFFICE 1,983,683

CHAIN FORMING MACHINE

Frank E. Stahl, Tonawanda, N. Y.

Application June 23, 1933, Serial No. 677,297

2 Claims. (Cl. 59—31)

My invention relates in general to chain forming machinery in which the joints of the links are butt welded by means of electricity. During such welding the ends of the link at the joint are forced toward each other; and, in order to secure a joint which will have strength at least equal to the cross-sectional area of the body part of the link, portions of the link are forced toward each other at the time the weld is completed or immediately afterwards and while the metal is still at welding heat so as to produce a bulge or swell around the joint. This bulge on the outside of the chain must be removed in order that the chain may be suitable for use in certain places. If this bulge is removed by cutting, grinding, or shearing, the added strength given to the joint by its presence is greatly reduced, and my present invention has to do with the removal of this bulge or swell from the outside of the chain while maintaining the full desired strength at the welded joint.

It has, therefore, been an object of my invention to provide means whereby the swell is reformed and by such reforming is substantially carried from the outside and side surfaces of the link and forced inwardly toward the inside of the link, without materially reducing the cross-sectional area of the link at the joint or affecting the strength thereof.

Another object has been to provide means for reforming the swell which will act upon both sides of the link at the same time.

Another object has been to provide such a device which may be conveniently attached to present chain welding machines and work in conjunction with the parts thereof.

The above objects and advantages have been accomplished by the device shown in the accompanying drawings, of which:

Fig. 1 is a side, fragmentary, sectional elevation of my device.

Fig. 2 is a top view of one of the links before welding.

Fig. 3 is a side view of such a link.

Fig. 4 is a side view of a link showing the weld completed and the swell produced.

Fig. 5 shows the finished joint after the swell has been reformed.

Fig. 6 shows a fragmentary, front elevation of the device.

Fig. 7 is an enlarged, fragmentary, side view showing a link in place just before being acted upon by the device.

Fig. 8 shows the link being acted upon.

My device is, of course, to be used in connection with the machine which butt welds the joints in the links, and it is arranged to be suspended above the finished joint and positioned between the welding electrodes so that it may be brought into action upon the joint after the welding operation has been completed and while the metal is still hot.

In the drawings I have shown but in fragmentary and somewhat diagrammatic manner the parts of the welding machine. As here shown, 10 is the bed of the machine and 11 is a fulcrum shaft suitably secured to some portion of the bed. My device 12 is supported by a bracket 13 which is slidably mounted for adjustment upon one of the vertical transformer posts 14. Another transformer post 15 passes through the bracket and is screw-threaded for the reception of adjusting nuts 16. These nuts are made to bear upon the top and bottom surfaces of the bracket and to thereby make it possible to adjust the bracket vertically. At the forward end of the bracket 13 there is formed a block guide 20 which has a cover 21 secured at its forward side. This guide is provided with a rectangular guideway 22 for the reception of the toggle block 23 which is slidable vertically within the guide.

A ram lever 25 is arranged over the block guide and is pivotally carried by a fulcrum arm 26. This fulcrum arm is rotatably supported by the fulcrum shaft 11 hereinbefore referred to. The rear end of the fulcrum lever is provided with a cam roller 27 which engages the cam 28. This cam serves to actuate my device and is mounted upon a shaft 29 which may be one of the shafts of the welding machine or a shaft separately provided for my device and properly timed in relation to the actuation of the welding machine.

The block guide 20 is extended downwardly and is provided with a lateral slot 35 within which are disposed two oppositely arranged rocker arms 36. These rocker arms are pivotally mounted upon rocker arm pins 37, and each of these arms has a downwardly extending leg 38 and an upwardly extending leg 39. The upwardly extending legs are bifurcated and also extend away from the vertical axis of the toggle block 23. In the upwardly extending leg 39 of each of the rocker arms is disposed one end of a toggle link 40. The opposite ends of the toggle links are pivotally attached by means of toggle pins 41 to the toggle block 23, a slot 42 being formed in the block for the reception of the links.

The toggle block 23 is connected to the outer end 45 of the ram lever 25 by means of a yoke 46 and an adjusting screw 47. The adjusting screw is provided with a right and left hand thread, one portion passing into the yoke 46 and the other portion into the toggle block 23. A nut 48 is formed upon the screw so that it may be rotated, and suitable lock nuts 49 are provided for setting the screw in its adjusted position. By means of the screw the distance between and the pressure exerted by the working faces of the rocker arms may be adjusted.

The lower legs 38 of the rocker arms are so arranged as to be disposed between the pairs of electrodes 31. To each of these lower legs 38 is secured a swell reforming anvil 50. Each of these anvils is preferably provided with a projection 51 which fits into a recess 52 formed in the leg, and each is held in place within the recess and against the leg by means of a bolt 53. Each of the anvils is provided with a working face 54 having its upper surface portion 55 of a radius substantially the same as the radius of the stock forming the link, so that those portions of the swell with which this surface portion contacts will be reformed. The combined surface portions 55 of the anvils engage with the outside surface and side surfaces of the link and thus leave these surfaces of substantially the same radius as the radius of the stock from which the link is made. Joining each of these surface portions 55 is a surface portion 56 of increased radius so that when the anvils are brought together as shown in Fig. 8 there will be provided some space into which the material of the swell 62 may be forced. By this formation the anvils force the metal from around the outside surfaces of the link at the joint downwardly toward the inside surface of the link from which it protrudes, as shown in Figs. 5 and 6. It is preferable that the flat surfaces 57 of the anvils immediately above the surface portions 55 do not contact with each other when the rocker arms have moved the anvils to their closed positions, for the reason that all the metal can not be completely removed from the outer part of the link and a small space is, therefore, left between the flat surfaces, whereby a slight tab 58 is formed. This tab is subsequently removed preferably by tumbling. The material in this tab 58 which is subsequently removed is not sufficient to in anywise affect the strength of the finished joint.

Also shown in the drawings are the electrode carriers 60 of the welding machine, upon each of which is mounted an electrode 61. The legs 38 of the rocker arms and the anvils 50 are mounted between the pairs of electrodes 61. As shown in Figs. 7 and 8 the electrode carriers and rocker arms are so timed that the electrodes have been moved to their operative positions when the anvils are brought into operative position.

The chain 63 (see Fig. 6) is suitably supported by the usual timing sprocket 64 while the chain is being acted upon. In Fig. 6 I also show the pushers 65 of the welding machine which serve to force the ends of the link together when the welding heat has been reached. The timing sprocket is, of course, actuated in timed relation with the other parts of the machine by means of the shaft 66 and interconnected means (not shown).

In Figs. 2 and 3 of the drawings I have shown a link formed from a blank having ends provided with the usual substantially parallel faces, but it is obvious that my device may be used for reforming the swell or bulge produced in the welded joints of links formed from blanks having any other shaped or formed ends, the link of Figs. 2 and 3 being shown for illustrative purposes only.

After the welding operation is completed and the ends of the link have been forced together so as to complete the weld and to form the usual swell 67 extending substantially uniformly around the joint shown in Fig. 7, the ram lever 25 is actuated by the cam 28 which causes the toggle block 23 to be moved downwardly. This reciprocal movement of the toggle block will, through the medium of the toggle links 40 and upper legs of the rocker arms, produce a powerful force upon the lower legs 38 of the rocker arms to carry them inwardly toward each other and to force the anvils 50 against the bulge or swell 67 at the welded joint thus forcing the metal in the swell 67 downwardly and reforming it into the swell 62 shown in Fig. 8. Just as soon as the swell 62 is formed the forward end 45 of the ram lever is elevated and the lower legs 38 of the rocker arms are separated by means of the toggle links and toggle block, whereupon the finished link is moved away and another link is moved into operative position by means of the timing sprocket. Since the anvils 50 are arranged between the electrodes, the reforming of the swell is accomplished immediately after the weld is completed and without much loss of heat.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A chain forming machine, comprising pairs of electrodes for heating the joint of each chain link being welded, means for applying pressure to the link for effecting a weld at the link joint, and a swell reforming device, comprising two oppositely arranged rocker arms, anvils carried by the rocker arms and arranged between a pair of electrodes at each side of the link joint, a slidably mounted toggle block above the arms, toggle links connecting the block with the arms, a ram lever connected to the block, and cam means for actuating the ram lever.

2. In a chain forming machine, the combination with an electric butt welding machine having pairs of electrodes for heating the joint of each chain link being welded, and means for applying pressure to the link for effecting a weld at the link joint, of a swell reforming device, comprising two oppositely arranged rocker arms, anvils carried by the rocker arms and arranged between a pair of electrodes at each side of the link joint, a slidably mounted toggle block above the arms, toggle links connecting the block with the arms, a ram lever connected to the block, and cam means for actuating the ram lever.

FRANK E. STAHL.